Feb. 5, 1946.　　　　G. C. WILHIDE　　　　2,394,348
ELECTRIC SCREW DRIVER AND NUT RUNNER
Filed July 11, 1940　　　　6 Sheets-Sheet 1
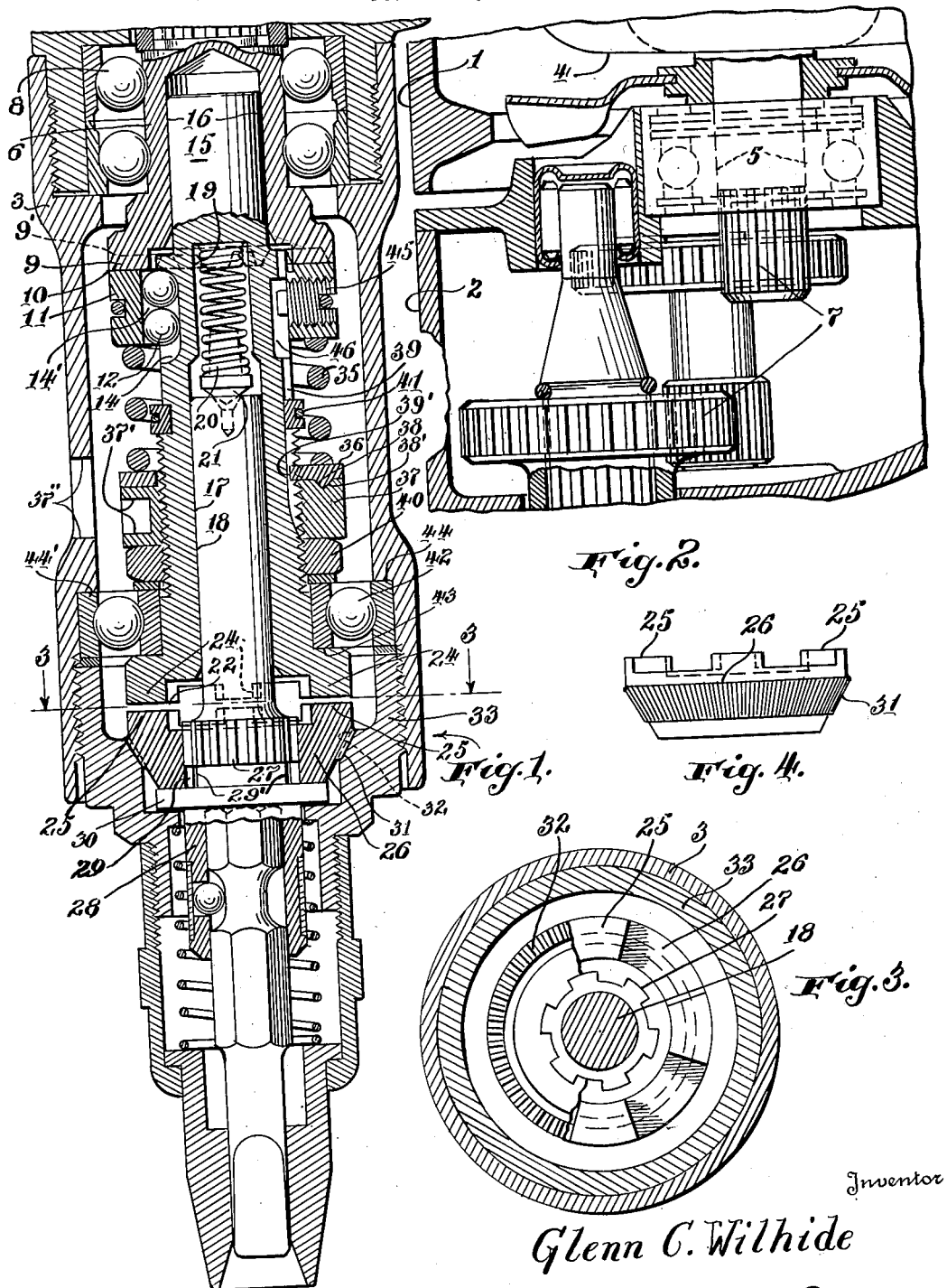
Inventor
Glenn C. Wilhide

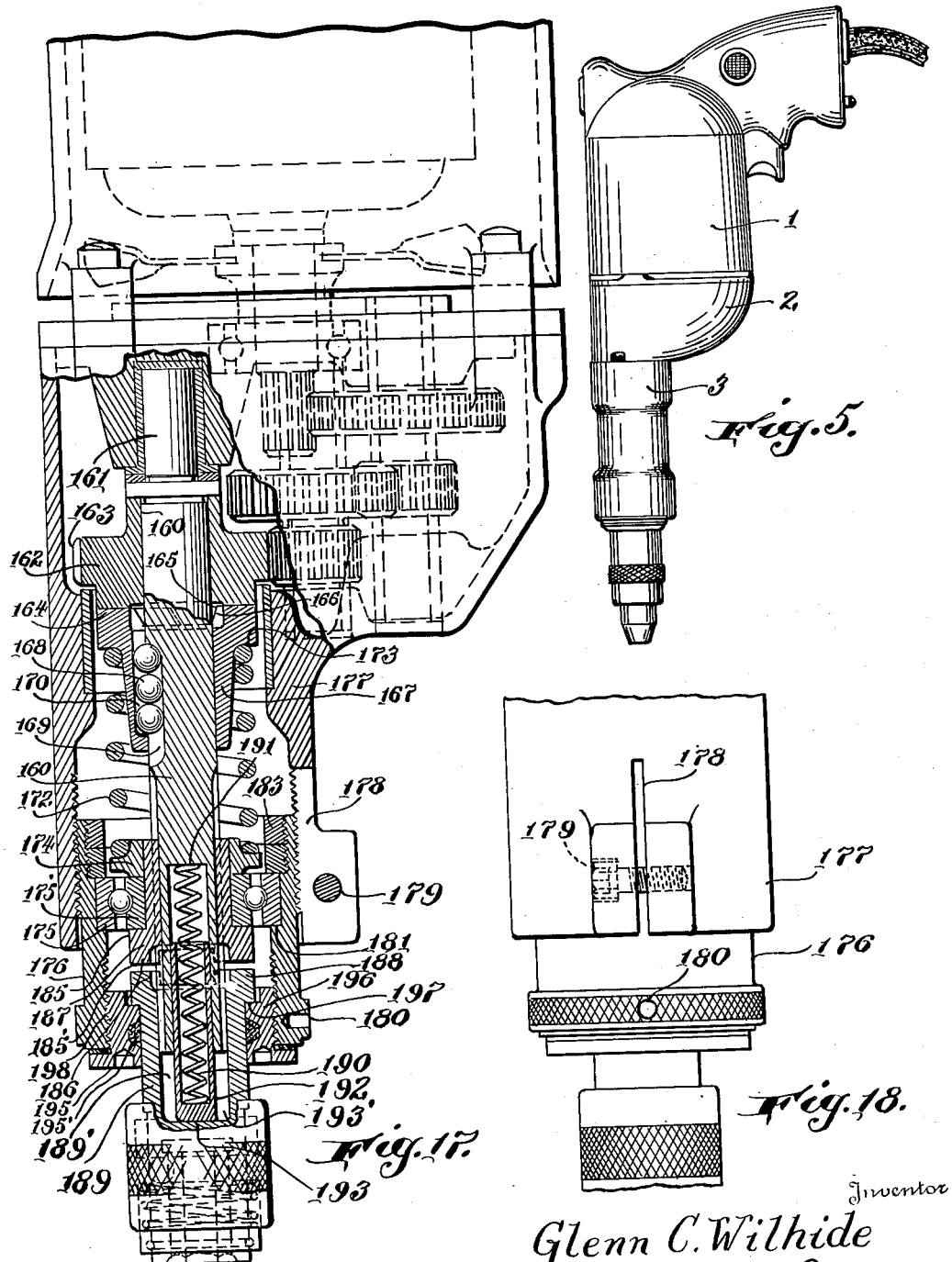

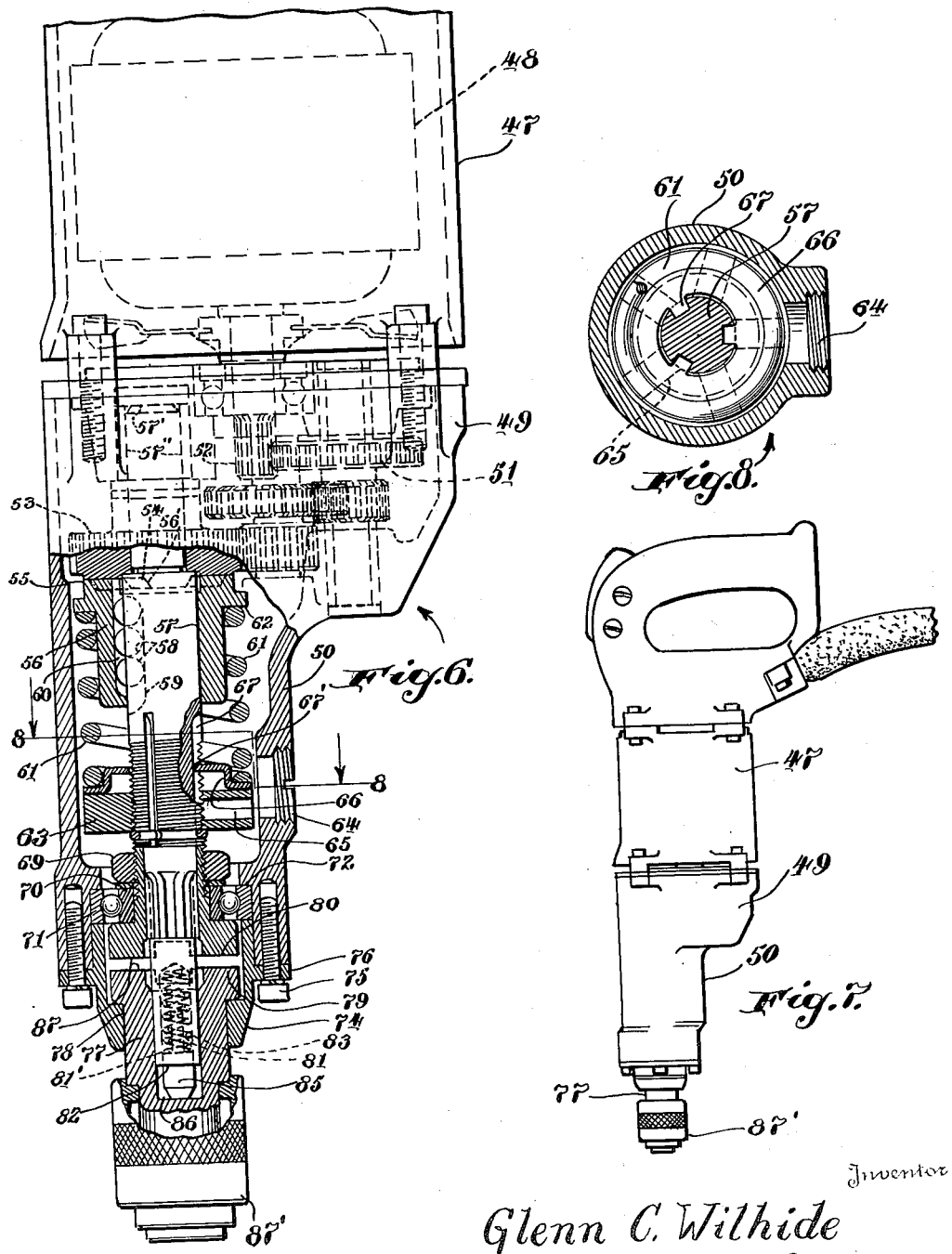

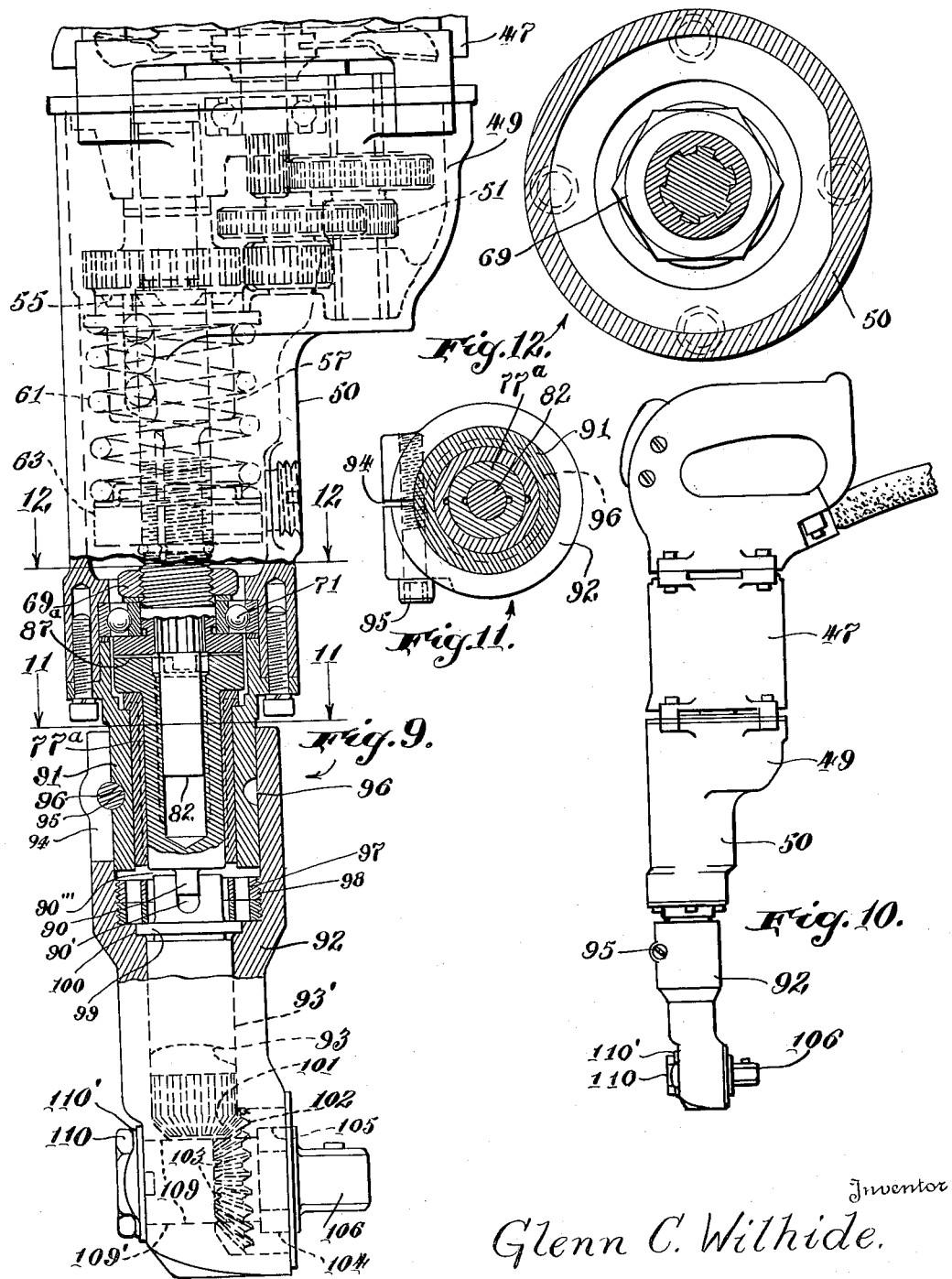

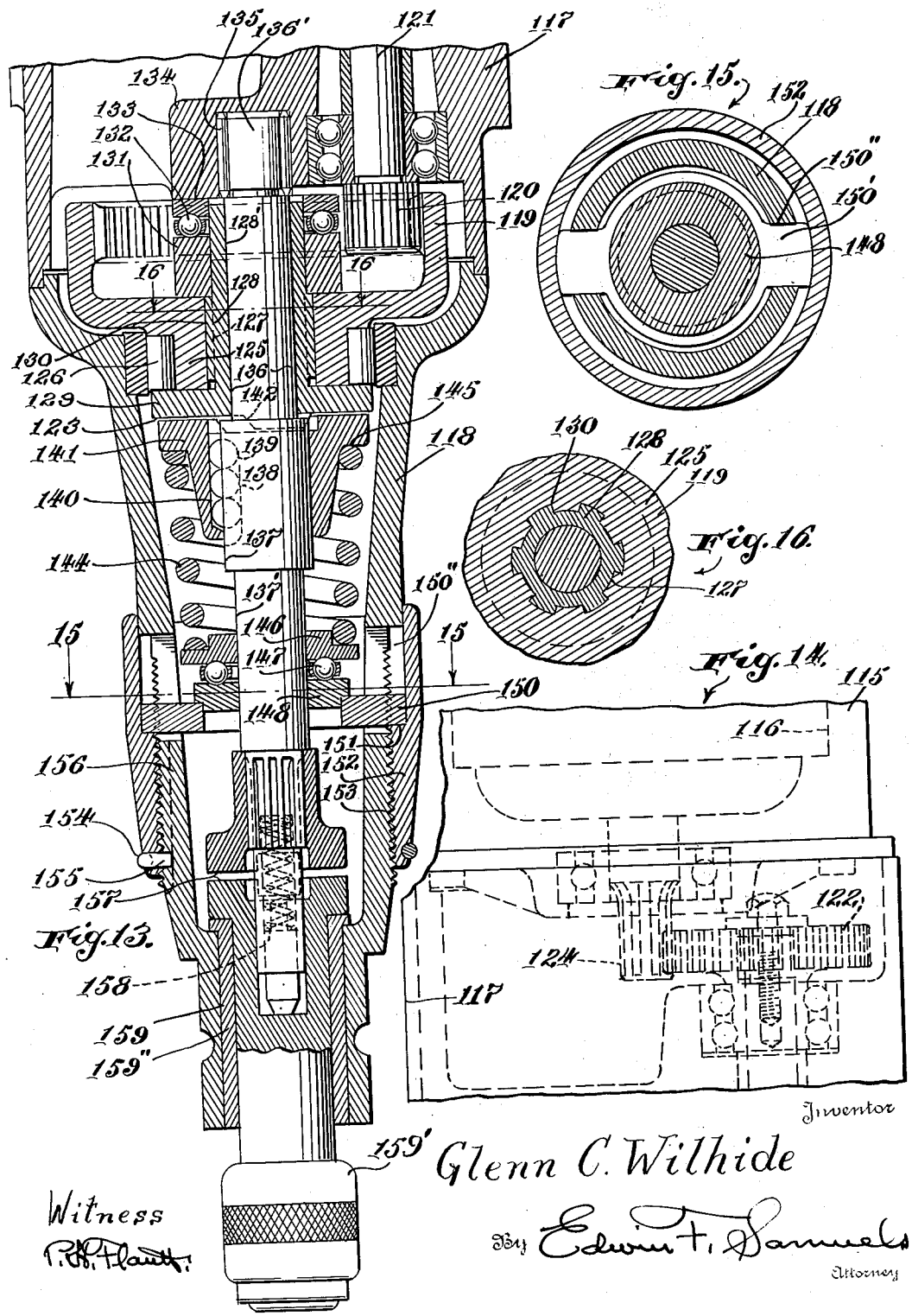

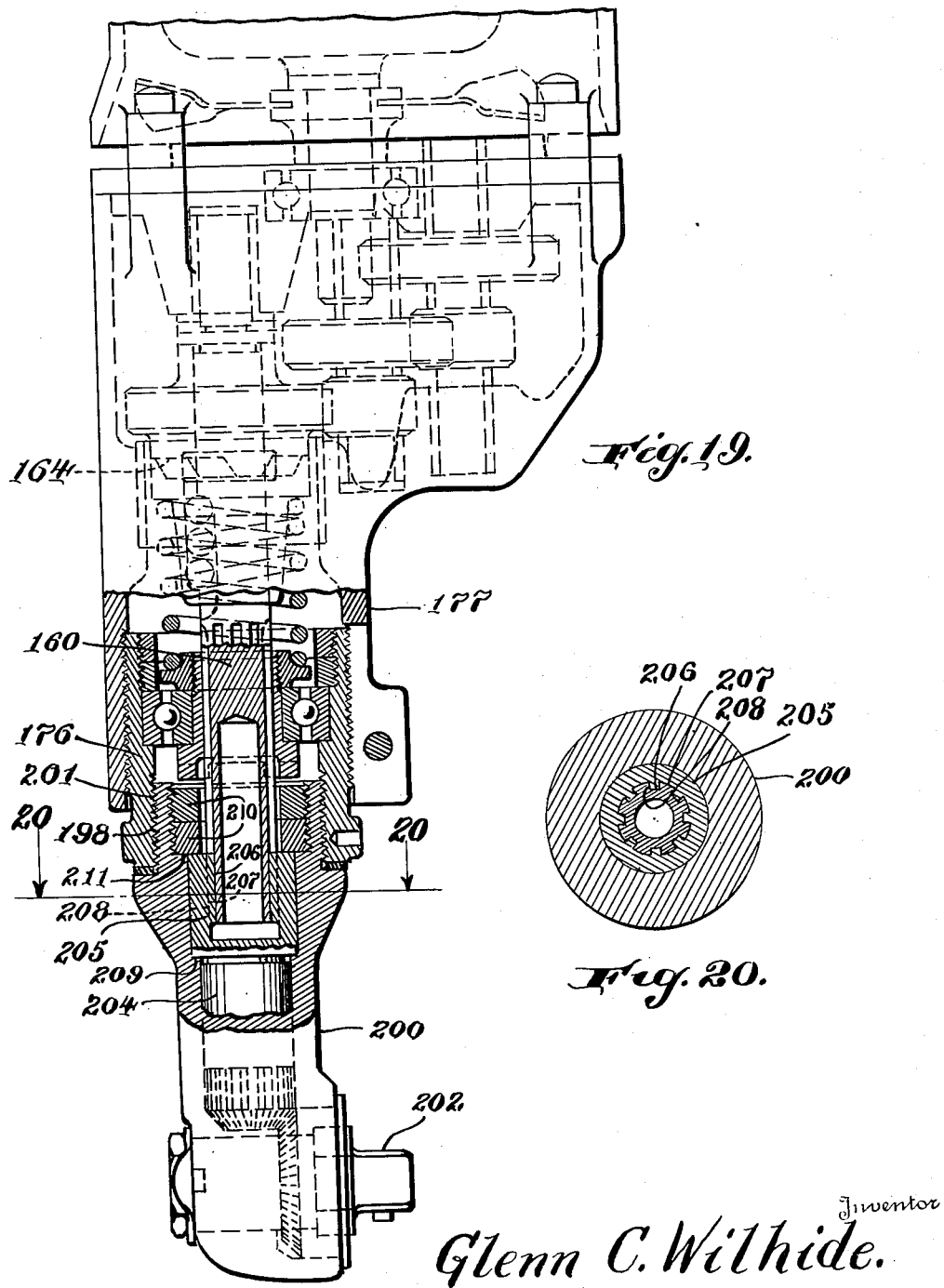

UNITED STATES PATENT OFFICE 2,394,348

ELECTRIC SCREW DRIVER AND NUT RUNNER

Glenn C. Wilhide, Baltimore County, Md., assignor to The Black and Decker Manufacturing Company, a corporation of Maryland Application July 11, 1940, Serial No. 344,893

13 Claims. (Cl. 144—32)

The invention relates to an electrically driven screw driver or nut runner of the portable or hand supported and controlled type, the specific forms of the invention herein described having been developed in connection with an electrically driven screw driver.

In this type of tool an overload release has been found necessary to provide a predetermined maximum torque to which the screws, nuts and bolts are to be set, thus preventing twisting off of the heads, stripping threads and too deep setting of the screws and disfigurement of the screw heads. This also serves to adapt the tool to different sizes of screws, nuts and bolts which require setting to different tensions; and in order to provide for engagement of the bit with the work at the various angles at which the screw slots or the nuts or bolt heads may be located, it is desirable that the driven spindle and bit be normally free of the drive to be engaged therewith when the tool is pressed against the work. The straight spindle tools contain the dead spindle arrangement for this purpose. However, in the right angle drive where such an arrangement would not be convenient and would involve excessive complication, this feature has been omitted.

The overload release and the dead spindle, i. e., the normally free driven spindle which is engaged by pressure of the tool against the work are found in the prior patents in various combinations. In some of these tools both functions are performed by a single clutch and in others there are two clutches, each of which serves one of the respective functions, but in the tools having the combined function of overload release and dead spindle for convenient engagement with the work, particularly where these functions are both served by a single clutch there is a tendency to set up a surge between the springs, due to spring vibration and particularly to the coincidence of the period of vibration of the springs at certain speeds. At and near these speeds the release of the adjustable or overload device does not always take place at the torque for which the adjustment has been determined.

It has also been found that in many of the prior art tools there is a harmful vibration due to the successive release and reengagement of the overload releasing clutch which is transmitted to the tool and to the hands of the workman causing premature weariness and resulting difficulty in continuous accurate control of the tool with consequent reduction of the efficiency of the workman both in the point of speed and accuracy.

There is also a tendency, in the majority if not all of the prior art tools to continued rotation of the driven spindle when the dead spindle clutch or dead spindle action is released, such continued rotation being due to friction between the rotating or driven spindle and the normally stationary spindle or parts connected therewith.

An object of the present invention is to provide in such an electrically driven portable screw driver, nut runner or wrench the essential adjustable or overload release and dead spindle action with a complete absence of surging of the springs which has in the past been essential to this function. At the same time the harmful vibration of said tool has been overcome, the tendency to vibration due to the release of the adjustable clutch being taken up in the frame or casing and absorbed; whereby the workman is completely protected from harmful vibration.

The invention also provides a braking device which is automatically engaged, preventing rotation of the bit or clutch when the dead spindle clutch is released thus holding the dead spindle stationary for convenient engagement with the work. The braking action is, however, easily overcome when and if it is desired to turn the bit by hand in order to reach the desired position for engagement with the work.

The invention also includes a preferred and various modified forms and the features and details thus involved and the various combinations thereof, including the application of the forms of overload release disclosed, to the right angle drive in which the axis of the bit is at an angle to the main spindle. The right angle drives shown are so designed and constructed that they are capable of production by easy and cheap modifications of the straight spindle type of tool which is sold in the largest numbers and is, therefore, the product made in the largest quantities. It is also of interest that some of the straight spindle types of tool shown have been constructed, partly, at least, with a view to such modification to the right angle type by interchangeability of one or two parts and at small cost.

In the accompanying drawings, I have illustrated a preferred and various modified forms of the invention:

In the drawings:

Fig. 1 is a section on a plane of the axis of the spindle and spindle housing of a screw driver or nut runner constructed in accordance with the preferred form of the invention, the view being fragmentary.

Fig. 2 is a fragmentary section through the gear casing on the same plane, the section Fig. 2 being taken immediately above the section 1.

Fig. 3 is a section on the line 3—3 in Fig. 1 looking downwardly and broken away to show the brake surfaces.

Fig. 4 is a side elevation of the moving brake member of the dead spindle brake removed.

Fig. 5 is an outside elevation on a reduced scale of the tool shown fragmentarily and in detail in Figs. 1 to 4.

Fig. 6 is a section similar to Fig. 1 taken on a plane of the spindle axis, but to reduced scale, the gear casing and part of the field casing being shown fragmentarily in elevation.

Fig. 7 is an outside elevation to a further reduced scale of the tool assembled.

Fig. 8 is a section on the line 8—8 in Fig. 6.

Fig. 9 is a section corresponding to Fig. 6 showing a tool similar to that in Fig. 6, the section terminating near line 8 in Fig. 6, the tool shown being provided with the angle head.

Fig. 10 is an outside elevation of this tool drawn to a reduced scale.

Fig. 11 is a section on the lines 11—11 in Fig. 9.

Fig. 12 is a section on the line 12—12 in Fig. 9.

Fig. 13 is a fragmentary section on a plane of the axis, i. e., a central section showing a still further modified form of the straight spindle type of tool the view corresponding to Figs. 1 and 6.

Fig. 14 is a fragmentary elevation of the gear casing and motor casing of the tool Fig. 13, the parts within being shown in broken lines and the fragment shown in Fig. 14 being immediately above the fragment shown in Fig. 13.

Fig. 15 is a section on the line 15—15 in Fig. 13.

Fig. 16 is a section on the line 16—16 in Fig. 13, the same being fragmentary as to the entire periphery to exclude the outer portion of the annulus and casing which are regarded as unnecessary to this view.

Fig. 17 is a section on a plane of the spindle axis corresponding to Figs. 1, 6 and 13, showing fragmentarily the spindle and spindle housing of a straight line type of tool, the upper part of the spindle housing, the gear casing, and motor housing not being shown.

Fig. 18 is a fragmentary side elevation of the same.

Fig. 19 shows a modified form of this tool adapted to the straight line drive.

Fig. 20 is a section on line 20—20, Fig. 19.

Referring to the drawings by numerals each of which is used to indicate the same or similar parts in the different figures and having reference first to Figs. 1 to 5, the construction shown is in the nature of a portable or hand supported and controlled electric screw driver having a field or motor casing 1, a gear casing 2, and a spindle housing 3.

The motor is indicated fragmentarily at 4 having a shaft 5 which drives the main spindle 6 by way of reducing gear train 7. This main spindle is mounted in ball bearing 8 and is provided at its lower end with clutch teeth 9 which engage corresponding teeth 9' on the movable clutch member 10 of the overload release or adjustable clutch 11. This clutch member 10 is keyed by means of balls 12 to the intermediate spindle 15 which has a rotary bearing at its upper end in the bore 16 in the main spindle 6. The balls 12 are mounted in grooves 14 and 14' in the intermediate spindle 15 and clutch member 10 respectively.

The intermediate spindle 15 is bored as to its lower half at 17 to receive the upper end of the driven spindle 18 which is slidably and rotatably mounted therein, the intermediate spindle 15 having above the bore 17 a chamber or smaller bore 19 which contains a helical spring 20 bearing at its upper end against the upper end of said bore and at its lower end against the thrust member 21 which engages the center of the upper end of the dead spindle or driven spindle 18, applying to the latter a downward thrust which maintains the dead spindle clutch to be described in normally disengaged condition, giving the dead spindle action previously mentioned.

The dead spindle clutch 22 comprises downwardly disposed teeth 24 formed on the lower end of the intermediate spindle 15 and upwardly disposed co-operating teeth 25 formed on the lower clutch member 26. The clutch member 26 has a central internally splined opening 29 to receive a correspondingly splined peripheral portion 27 of the dead spindle 18 on to which member 26 is forced, or with which it is otherwise engaged. The bit holder or chuck member 28 is formed on the lower end of the dead spindle 18. The spindle 18 is shown as having a reduced shank 29' below portion 27 and the spindle is shown as provided with a flange or flat ring 30 which may be provided to determine the position of the clutch member 26 on spindle 18.

An important feature is the provision of a downwardly disposed inverted frustoconical surface 31 on the clutch member 26, which in the lower or disengaged position of the dead spindle clutch bears against an upwardly disposed internal frustoconical surface 32 on the cap 33 which is a stationary portion of the spindle housing threaded into the latter as shown or otherwise mounted.

These two frustoconical surfaces 31 and 32 co-operate in the lower position of the dead spindle when the clutch 22 is disengaged to prevent the rotary tendency of the dead spindle and hold it stationary overcoming the friction due to the bearing of the dead spindle 18 in the bore 17 of the intermediate spindle 15. The latter is normally in rotation when the dead spindle is released and the dead spindle chuck and bit are to best advantage stationary for convenient engagement with the work.

The surfaces, 31 on the clutch member 26, and 32 on the housing or cap may be serrated or knurled as shown in Figs. 3 and 4, though smooth surfaces are found, by actual test, in practice, to be sufficient to provide the necessary braking action. The two frustoconical surfaces are preferably of exactly the same configuration. The braking action referred to is not positive, the tension of spring 20, being comparatively slight so that the screw driver blade or bit can be turned by hand in either direction for adjustment to the work. The braking surfaces do not have a locking function, being non-positive.

In operation the adjustable clutch or overload releasing clutch 11 is held normally engaged by helical spring 35. This spring bears against the sliding clutch member 10 at its upper end and at its lower end against a washer 36 or other suitable abutment on and preferably secured to the adjusting nut 37. As shown, there is a projection 38 and an indentation 38' in the respective surfaces of the nut and washer. The washer serves key wise to hold the nut against rotation on the spindle, having a projection 39' engaging a key slot 39 in the intermediate spindle 15 which is threaded to receive the adjusting nut 37. The nut 37 is shown as bearing against a nut 40 and adjustment is apparently limited by a ring 41 which is set into the intermediate spindle 15 as illustrated. Adjustment of spring 35, by nut 37, is accomplished by means of a pin engaging holes 37' in the nut, the same being introduced through hole 37" on the housing.

The intermediate spindle is provided at its lower end with a ball bearing 42 which is engaged on one side by a shoulder 43 on the lower end of the intermediate spindle and above, i. e., on the other side by the nut 40 on said spindle. The bearing is seated against a shoulder 44' in the spindle housing 3 above and forced up against the shoulder 44' by the cap 33 threaded upwardly into the lower end of the spindle housing.

The adjustable or overload release clutch 11, particularly the moving clutch member 10 thereof which is keyed to the intermediate spindle 15 by means of the balls 12 in the slot 14 and 14', slides or rolls downwardly on these balls in response to the overload thrust due to the operation of the inclined surfaces of the teeth 9, 9' of said clutch. The motion of the clutch member 10 is limited by a screw pin 45 which is threaded through clutch member 10, inwardly in a radial direction engaging a slot 46 in the intermediate spindle 15.

In view of the foregoing description, it is apparent that the overload releasing clutch 11, being normally closed by spring 35, releases freely on the overload by the downward sliding of the clutch member 10 on the balls 12, and that the vibrations due to repeated release of the clutch are taken up by the intermediate spindle 15 and transmitted by the nut 40 to the bearing 42, and hence to the frame or casing being absorbed by the frame. Transmission of the vibrations to the hands of the operator is thus avoided.

It is also apparent that the dead spindle spring 20 holds the dead or driven spindle 18 normally depressed so that the dead spindle clutch 22 is normally released and the braking surfaces 31, 32 normally engaged, holding the dead spindle stationary, eliminating the tendency to rotation due to friction at 17, 18. It is also important that the springs 20 and 35 are widely different in size and tension and have widely different periods of vibration and there is no tendency of the intermediate spindle 15 having no longitudinal motion, to set up surging between these springs by transmitting vibration from one to the other. In other words, the contraction and expansion of spring 35 has no influence on the operation of spring 20 and vice versa so that surging and the consequent tendency to variation of the tension at which the adjustable clutch member releases are avoided.

Referring now to Figs. 6, 7 and 8, the form of tool illustrated is similar as to principle to that described in connection with Figs. 1 to 5 but is different in detail being particularly adapted for embodiment in units somewhat larger than those in which the form previously described in connection with Figs. 1 to 5 is embodied. The form of tool now to be described is also designed for quick and inexpensive adaptation to the angle head or angle drive as hereinafter illustrated and described.

The tool illustrated in Figs. 6 to 8 comprises a motor housing 47, enclosing a motor 48 indicated in broken lines. This construction also includes a gear casing 49 and spindle housing 50 shown as integral with the gear casing.

Within the gear casing 49 there is a train of reducing gears 51 which in accordance with the usual practice, also true of the previous disclosure, is operated by and from a pinion 52 formed on the motor shaft. In the form illustrated in these figures, there is at the driven end of the train a gear 53 which carries integral therewith and formed thereon upper clutch teeth 54 of the overload or adjustable clutch 55. These teeth preferably have the inclined faces usual in this type of clutch. This overload release clutch or adjusting clutch 55 also includes a sliding clutch member 56 mounted on the main spindle 57 and connected thereto by balls 58 which slide in a groove 59 therein, engaging a corresponding groove 60 in the sliding clutch member 56. This member 56 is provided at its upper end with teeth 56' which mesh with the teeth 54 already described being normally in engagement therewith.

The clutch 55 is held normally in engagement by means of the helical spring 61 which surrounds the clutch member 56 and spindle 57 and bears at its upper end against a shoulder 62 on the sliding clutch member 56 and at its lower end against an adjustable nut 63 threaded on to the main spindle. This nut is adjusted to determine the tension of release by means of a pin not shown which is passed through the opening 64 in the spindle housing and enters a hole or holes 65 in the nut 63.

While the nut 63 takes up the spring pressure, the spring bears directly upon a shouldered washer 66 which has an inwardly projecting portion 67' engaging the splines or grooves 67 in the spindle. Because of this latter engagement, the washer does not rotate when the nut is adjusted or at any time and does not, therefore, interfere with the operation of the spring, and it prevents accidental turning of the nut 63, and loss of the spring adjustment, the nut being preferably engaged with the washer in any suitable manner.

The spindle or main spindle 57 is held against longitudinal motion by means of a nut or abutment 69 threaded thereon below the nut 63 and bearing by way of washer 70 directly on the ball bearing 71 in which the main spindle has its lower bearing. This bearing is secured in the spindle housing, being pressed upwardly against the downwardly disposed shoulder 72 on the housing, by means of the end cap 74 which enters within the spindle housing and is held in position by screws 75 passing upwardly through a flange 76 on the cap and into the housing as shown. This main spindle 57 has an end flange or shoulder which is supported by nut 69 against the bottom of the bearing 71. Such details described throughout this specification are capable of variation. It is also noted that the upper end 57' of said spindle has a bearing in the frame at 57".

The driven spindle or dead spindle 77 is mounted to slide in bearings 78 formed in the lower end of the cap 74, and is provided at its upper end with upwardly disposed clutch teeth 79 which co-operate with downwardly disposed teeth 80 on the lower end of the spindle 57 providing a dead spindle clutch 81, these teeth are preferably straight teeth which have no tendency to release by overload.

The driven spindle 77 is given a normal downward tendency by means of a spring 81 which is mounted in a bore 83 in the lower extension 82 of the spindle 57, the bore being indicated by broken lines at 83.

The spring 81 bears at its upper end against the upper end of the bore and at its lower end against plunger 85 which in turn bears against the bottom end of a bore 86 in the driven spindle in which the extension 82 of the spindle 57 or main spindle rotates, being shown as free of the sides of said bore.

The spring 61 holds the adjustable or overload releasing clutch 55 normally in engagement and on the application of an excess torque to the spindle this clutch releases due to sliding or rolling of lower member 56 downwardly on the balls 58. Any vibration due to repeated engagement and release of this clutch is taken up by the frame being received from the spring 61 by the washer 66 and the nut 63 and transmitted downwardly through the main spindle by way of the abutment or nut 69 to the bearing 71 and hence to the frame and cap 74 which is rigid with the frame or housing 50. All harmful vibration is thus taken up by the frame or casing and not transmitted to the workman.

As in the construction previously described, the dead spindle clutch 87 is normally released by the spring 81, the clutch being thrown into driving engagement operating the driven spindle when the bit is pressed against the work.

The chuck used in this connection is indicated by reference character 87'. This may be of any suitable type.

Referring now to Figs. 9 to 12, this portion of the illustration relates to an adaptation of the tool Figs. 6 to 8 to the angle drive also called angle head. The construction of the tool Figs. 9 to 12 is identical with that of Figs. 6 to 8 as to the motor casing or field casing 47, gear train 51, gear casing 49, spindle housing 50 and also as to the main spindle 57, overload clutch 55, spring 61 and spring adjusting nut 63, all of which are in casing 50 and are hence concealed and shown in broken lines in Fig. 9. The abutment nut 69 and bearing 71 are all similar and similarly mounted. The dead spindle clutch 87 of Fig. 6 is also present in Fig. 9 at 87ᵃ but there is no spring and no provision for release, the purpose being to retain as many as possible of the parts used in the form Fig. 6, i. e., to use them in the angle head type Figs. 9 to 12, for cheapness of production as to both forms. This clutch thus becomes a coupling 87ᵃ, and for the driven spindle 77 of Fig. 6, there is substituted in Fig. 9, a corresponding element 77—a, referred to as an angle head shaft. This shaft 77—a is like the driven spindle 77 as to the upper end being held against longitudinal motion by the sleeve member 91 to be described. Angle head shaft 77—a is provided at its lower or remote end with a tooth or teeth 90, adapted to be engaged with a slot or notch 90' in the adjacent end of the angle head spindle 93, forming coupling 90'''. The shaft 77—a and angle head spindle 93, having no longitudinal motion and no spring, coupling 90''' is not releasable. Cap member 74 of Fig. 6 is replaced in Fig. 9 by said sleeve member 91 which contains a bearing for said shaft 77—a and serves as a support and connection for the angle head or angle head housing 92. The sleeve member 91 receives in telescopic relation and supports the angle head housing 92 which provides a bearing 93' for the spindle or shaft 93 of the angle head. This angle head is shown as hollow and enlarged at its upper end, to take over the sleeve member 91, and is preferably split as shown at 94 and fastened about the member 91 in any suitable manner as by means of a bolt 95 which is placed transversely of the split in the usual manner and the member 91 is grooved at 96 to receive the bolt. The angle head is thus detachable with its parts.

The angle head spindle 93 is held in position in the angle head 92 by threaded collars 97 which are screwed into a threaded cavity 98 in the angle head, said collars 97 engaging a flange 99, on the spindle 93, being in a circumferential seat 100 immediately below the threaded portion 98 and of less diameter. This flange 99 prevents endwise motion of the angle head spindle.

This latter spindle is provided at its lower end with suitable bevel gear teeth 101 which mesh with corresponding bevel gear teeth 102 on the gear 103, said gear being provided with a hexagonal opening 104 opposite to the teeth in which the hexagonal head 105 of the chuck shank 106 is adapted to fit with its axis at right angles to the spindle 93.

This gear 103 is mounted on a stud 109 which is integral with chuck shank 106 and extends to the left from the head 105 through gear 103, having a bearing 109' in the housing 92. The stud 109 is held in position by a nut 110 at the lower left in Fig. 9 which nut engages a washer 110' on the outside of the housing 92.

This type of tool has the overload release without the dead spindle operation, the spindle being turnable by hand when necessary in order to conform the bit to position of the work. The purpose of this type of tool is to reach into confined spaces which do not accommodate the full height of the straight spindle type of tool and it is an important having of expense that this tool can be produced with the identical parts of the straight line tool except as to the cap which is substituted by the tubular support 91 and the coupling details substituted for the dead spindle clutch and its angle head and parts essential to the angle type of tool.

Referring now to Figs. 13 to 16, the type of tool herein illustrated is different from that shown in Figs. 1 and 6, mainly in that the adjustable clutch or overload release is adjusted as to the tension of release by means of an external sleeve, other features and details being selected and arranged to conform to this arrangement and to obtain the highest degree of efficiency and economy in its use.

As shown in Figs. 13 to 16, the tool comprises a field casing 115 enclosing a motor indicated in broken lines at 116, and the tool also includes a gear casing 117, containing reducing gears to be described, and a spindle housing 118.

Enclosed in the gear casing 117 is an annulus or internal gear 119 driven by a pinion 120 mounted on a stud shaft 121 which is driven by a gear 122 secured thereto and in turn driven by a pinion 124 on the motor shaft. This annulus 119 is provided with a downwardly projecting boss 125 which runs in a roller bearing 126 seated in the upper end of the spindle housing 118. This boss has a central splined opening 127 in which is secured by corresponding splines the upwardly disposed tubular shank 128 of the upper clutch member 129 of the overload releasing clutch 123. This shank 128 carries forced on its upper end portion above the splines 130 a thrust collar or abutment 131. This collar 131 bears against a ball thrust bearing 132 which encircles the upper end portion 128' of the shank 128 and bears against a downwardly disposed surface 133 of the casing. This portion of the casing, shown in the form of a boss 134 has mounted therein a pin bearing 135 for the upper end 136' of the spindle 136. The bearing 132 takes up the upward thrust of the upper clutch member 129.

The main spindle 136, which rotates freely in a bearing 128' in the shank 128 of the upper clutch member 129, is provided below said upper clutch member 129 with an enlarged cylindrical portion 137 which is grooved at 138 to receive balls 139 which also project into a groove 140 in the sliding or lower clutch member 141 of the overload releasing clutch 123. The clutch members 141 and 129 are provided with teeth 142 having inclined releasing surfaces as shown. The lower clutch member which is slidable without friction by the rolling of the balls 139, is given an upward tendency at all times by helical spring 144 which encircles spindle 136 and clutch member 141, and bears at its upper end against a shoulder on the sliding clutch member at 145, and at its lower end against a collar 146, which rests on a ball thrust bearing 147, supported on a disc like collar 148 which encircles the reduced portion 137' of the spindle 136 below the cylindrical portion 131. The said collar 146, bearing 147 and collar 148 are supported on a flat ring 150 seated on opposite shoulders 151 of an internally threaded sleeve 152 which is threaded on to the spindle housing at 153, said housing having already been indicated at 118.

This ring 150, see Fig. 15, has projecting ears 150" 150' which project outwardly through slots 150" in the housing 118 which ears rest on the said shoulders 151 of the sleeve 152 whereby the tension of the spring 144 is changed at the will of the operator by merely turning the sleeve 152 and moving it up and down by means of said threaded engagement 153.

The sleeve is locked in any desired position of engagement by means of a spring ring 154 which has inturned end 155 engaging a key slot 156 in the housing 118. The dead spindle clutch 157 is similar to and similarly arranged to those already described being held normally open by a spring 158 and being closed by the thrust of the tool against the work. The driven spindle 159 carrying chuck 159' slides and rotates in bearing 159" mounted in the lower end of the spindle housing 118.

Referring now to Figs. 17 and 18, the construction shown is similar as to the overload release and the dead spindle operation to that in Figs. 13 to 16 being different mainly as to the operation of the adjusting sleeve, and the convenient adaptability of the construction to the angle drive.

The main spindle 160 is mounted in a suitable bearing 161 in the spindle housing, said bearing being at the upper end of the spindle, and the said spindle is provided with a gear 162 rotatively mounted thereon, i. e., free to rotate relatively thereto. Gear 162 has teeth 163 which mesh with a corresponding gear of a suitable reducing train not shown. The gear 162 also serves as the upper clutch member of the adjustable or overload releasing clutch 164 having formed thereon clutch teeth 165 which have inclined releasing surfaces as shown and mesh with similar teeth 166 on the lower sliding clutch member 167. This lower sliding clutch member is keyed by means of balls 168 mounted in the groove 169 in the spindle 160 and registering groove 170 in the sliding clutch member 167, whereby the lower or sliding clutch member operates the spindle 160 imparting to it the necessary rotating motion. The clutch member 167 also slides or rolls on the balls 168.

The sliding clutch member 167 is held with its teeth 166 normally in engagement with the teeth 165 of the upper clutch member formed on the gear 162, being urged upwardly by the spring 172 which bears at its upper end against said sliding clutch member 167 or the shoulder 173 thereon and at its other or lower end against a collar 174 which encircles the spindle and rests on the inner races 175' of the ball bearing 175. This bearing is seated in an adjusting ring or sleeve 176 which is threaded into the inside of the spindle housing 177. Said housing is shown as split at 178 and clamped by means of a screw 179 whereby the sleeve is clamped to the housing when desired. This sleeve 176 being freed by loosening said screw is rotated in the process of adjustment by means of a pin not shown engaged in a suitable hole or holes 180 in its lower periphery.

The ball thrust bearing 175 or the outer race thereof is held against an upwardly disposed shoulder 181 on the inside of the ring being forced downwardly against this shoulder by threaded locking rings or collars 183 which are screwed down against the ball bearing from above being threaded downwardly inside of the adjusting sleeve 176.

In this instance, the dead spindle clutch 185' includes a hollow clutch shaft, mounted on the spindle 160 and keyed to the outside of the spindle 160 to slide relatively thereto, the hollow clutch shaft being shown at 185 and having at its lower end downwardly disposed dead spindle clutch teeth 186. This hollow clutch shaft 185 is held against longitudinal motion, i. e., motion in the direction of the spindle axis by an upwardly disposed shoulder 187 thereon which bears against the lower end of the inner ball race 175' of the aring 175. The hollow shaft 185 is supported by bearing 175 being forced into inner race 175'. The lower member of the dead spindle clutch indicated by reference character 188 is formed on the hollow, dead or driven spindle 189 which slides and turns freely on the lower end of the main spindle 160. This dead spindle is urged downwardly, holding the dead spindle clutch 185' normally open by means of a spring 190, bearing at its upper end against the upper end of the hollow 191, in the spindle 160 and being encased as to its lower end in a spring casing 192 which bears at its lower end against the lower end or abutment 193 of the hollow 193' formed in the driven or dead spindle 189. In this way the dead spindle clutch is held normally open to be engaged when the tool is pressed against the work. The overload release or adjusting clutch which is normally closed is adjusted by means of the sleeve 176 which is rotated as aforesaid by means of a pin entering the hole 180. The sleeve 176 engages and guides the dead spindle 189 by way of a gland 195 having packing 195' which prevents the escape of the lubricant. The gland member 195 which is screwed into threads 198 on the inside of adjusting sleeve 176 also supports the driven spindle by a shoulder 197 limiting its downward motion in response to spring 190, and it provides a bearing therefor.

Referring now to Fig. 19, there is illustrated a spindle housing 177 and a main spindle 160, identical with the corresponding parts in Figs. 17 and 18, the device illustrated in Fig. 19 being identical with the construction of Figs. 17 and 18 except for the angle head, casing and drive, substituted for the corresponding details shown in Figs. 17 and 18.

For this purpose the gland 195 of Fig. 17 has been removed and the angle head 200, having a threaded shank 201, is threaded into the adjusting sleeve 176 in place of said gland 195, the threaded shank 201 of the angle head being adapted to fit into and engage the threads 198 of the previous construction, i. e., within the sleeve 176. Any suitable type of engagement may be used.

The angle head 200 contains a pair of bevel gears and a chuck shaft 202, the gears corresponding to gears 101, 103 in Fig. 9 and the chuck shaft to 106 in Fig. 9, the axis of the chuck being in angular relation to the axis of the spindle 160.

In the present construction Fig. 19, instead of the dead spindle or driven spindle 189, there is an angle head spindle or shaft 204 having a hollow portion 205 at its upper end in Fig. 19 disposed toward the motor and shown as enlarged for this purpose.

This enlarged portion is bored in line with its axis at 206 and provided with internal splines or keys 207 engaging external splines or slots 208 in the lower end of the main spindle 160 which enters the bore 207 in the angle head shaft 204, forming a telescoping and driving engagement which provides for or permits the adjustment of the overload releasing clutch.

The head shaft 204 is supported and positioned between an internal shoulder 209 in the angle head 200 which shoulder engages the lower end of the enlarged portion 205 and two ring nuts 210 which are threaded into the upper end of the angle head, bearing against an internal shoulder 211 in the housing or head. The dead spindle spring shown at 190 in Fig. 17 is omitted and there is no dead spindle action. The overload release is as shown in Fig. 17.

It is of importance as to the angle head constructions, Figs. 9 and 19, that they are produced by the easy conversion of the straight spindle type of tool, using almost all of the same parts. In both, there is a main spindle driven through an overload releasing clutch and both are derived from a straight spindle type of tool, in which latter tool the main spindle drives a dead spindle or driven spindle connected to the main spindle by a dead spindle clutch. In these straight spindle tools there is a removable bearing for the dead spindle and the dead spindle is removable with the said bearing, or immediately thereafter.

In the angle head tools of Figs. 9 and 19, the angle head has a supporting means and securing means attachable in place of said dead spindle bearing and an angle head spindle with a driving connection or coupling means which is connected to the main spindle in continuous driving relation as the angle head or angle head housing is attached.

The invention also relates to improvements in and to the overload release and to the combination of the overload release with the dead spindle action and to the adaptation of the straight line axis tool to the angle head by the simple substitution of the angle head housing for the gland or cap in the straight line tool, and of the angle head for dead or driven spindle.

It is of importance as to all forms of the tool illustrated that the vibration due to the release or repeated release of the overload or adjustable clutch is taken up and absorbed by frame or casing so that no harmful vibration is transmitted to the hands of the operator.

An improvement of importance as to the dead spindle type consists in the provision of an effective and simple form of brake, which is automatically engaged when the dead spindle clutch is opened, and disengaged when the tool is pressed against the work to close the dead spindle clutch. Thus the driven spindle or dead spindle is held stationary for engagement with the work overcoming the frictional tendency to rotation, the operation of the brake being such that the bit may be turned, by hand if desired, to the most favorable position. Other features and combinations described are regarded as of importance from an inventive standpoint.

I have thus described specifically and in detail a preferred and a number of modified forms of the invention, the description being specific and in detail in order that the manner of constructing, applying, operating and using the same may be fully understood; however, the specific terms herein are used descriptively rather than in a limiting sense, the scope of the invention being defined in the claims.

What I claim as new and desire to secure by Letters Patent is:

1. The combination in a motor driven rotary tool of the hand supported and hand directed type, adapted for use as a screw driver or nut runner, of a hollow normally upright main spindle having a driving connection with the motor, said spindle having downwardly disposed overload releasing clutch teeth, an intermediate spindle having its upper end rotatively mounted in the hollow of said main spindle, a sliding clutch member mounted on and keyed to said intermediate spindle and having upwardly disposed teeth of the releasing type adapted to mesh with the teeth on said main spindle, key means whereby said sliding member is connected to said intermediate spindle, an adjustable abutment on said intermediate spindle, means for holding said abutment in various positions of adjustment arranged in the direction of the length of said spindle and a helical compression spring coiled about said spindle bearing at one end against said sliding clutch member and at its other end against said adjustable abutment, a spindle housing enclosing said main spindle and intermediate spindle, and having a thrust bearing rigidly supported thereon, an abutment on said intermediate spindle resting on said thrust bearing, means on said intermediate spindle engaging said bearing oppositely to said abutment to prevent longitudinal motion of said intermediate spindle and a rotatively mounted driven member also mounted to slide in the direction of the spindle axis, said intermediate spindle having a normally released positive clutch at its lower end connecting said driven member to said spindle and adapted to be engaged by pressure of the tool against the work.

2. The combination in a motor driven rotary tool of the hand supported and hand directed type adapted for use as a screw driver or nut runner, of a hollow main spindle having a driving connection with the motor, said spindle having overload releasing clutch teeth on its lower end, an intermediate spindle having its upper end rotating in the hollow of said main spindle, a sliding clutch member mounted on said intermediate spindle and having upwardly disposed releasing teeth adapted to mesh with the teeth on said main spindle said sliding clutch member having key means whereby it is connected to said intermediate spindle, an abutment adjustable in the direction of the spindle axis, a helical compression spring operating in the direction of said axis, and bearing at one end against said sliding clutch member and at its other end against said abutment, a spindle housing enclosing said main spindle and intermediate spindle and having a thrust bearing affording a rotary support for said abutment whereby the reaction of said spring and the vibration of said clutch member is taken up by said spindle housing, an abutment on said intermediate spindle engaging said thrust bearing from beneath, said intermediate spindle being hollow and having a dead spindle rotatively mounted in said hollow which serves as a bearing for the dead spindle, a spring bearing downwardly on said dead spindle, said dead spindle having upwardly disposed dead spindle clutch teeth and the lower end of the intermediate spindle having cooperating teeth.

3. In a rotary tool of the hand supported and directed type having a motor and a motor casing, a main spindle driven from said motor, a spindle housing, an intermediate spindle therein, overload releasing clutch means connected to said main spindle and a cooperating clutch member mounted to slide in the direction of the spindle axis and having a driving connection to said intermedate spindle, a compression spring operating in the direction of the tool axis and bearing at one end against said sliding clutch member tending to maintain the clutch means and member in engagement, an abutment rotatively supported on said spindle housing and adjustable in the direction of the spindle axis and engaging the opposite end of said spring whereby the vibration of the sliding clutch member in releasing and engaging is taken up in and by said spindle housing and not transmitted to the hand of the operator, and additional means for limiting longitudinal motion of said intermediate spindle and a normally released dead spindle clutch connected to said intermediate spindle at a point spaced downwardly from said releasing clutch, said dead spindle clutch comprising two clutch members one above the other and a compression spring urging the lower clutch member downwardly and a driven spindle attached to and moving with said lower clutch member connected to said intermediate spindle by said dead spindle clutch which is adapted to be engaged when the driven spindle is moved upwardly in opposition to the tension of said spring, the intermediate and driven spindles having axial telescoping relatively rotatable means which serve as an axial bearing therebetween, said last named spring being within and bearing upon an external element of said telescoping means and reversely bearing upon an internal element thereof.

4. In a rotary tool of the hand supported and directed type having a motor and a motor casing, a main spindle driven from said motor, and a spindle housing, an intermediate spindle therein, overload releasing clutch means connected to said main spindle and a cooperating clutch member mounted to move in the direction of the spindle axis and having a driving connection to said intermediate spindle, a compression spring operating in the direction of the spindle axis and bearing against said sliding clutch member tending to maintain the clutch in engagement, a rotating abutment positively supported by said spindle housing and adjustable in an axial direction relatively to the same and engaging the end of said spring opposite to said sliding clutch member whereby the vibration of the sliding clutch member in releasing and engaging is taken up in and by said spindle housing and not transmitted to the hand of the operator, additional means for preventing longitudinal motion of said intermediate spindle relatively to the housing, a driven spindle mounted to slide in the direction of said axis, a spring tending to move the latter spindle downwardly, a dead spindle clutch connecting the driven spindle to the intermediate spindle and normally released by said spring, said dead spindle clutch being engaged by upward pressure on said driven spindle, overcoming said latter spring, the spindle housing having an opening and the adjustable abutment having means adapted for engagement by an implement inserted through said opening for adjustment of the overload releasing clutch spring abutment.

5. In a portable motor driven screw driving tool of the hand supported and controlled type, the combination of a main spindle overload releasing means comprising a clutch having teeth extending and interengaging in the direction of the tool axis, the clutch having inclined releasing surfaces and being engageable and disengageable by motion of one clutch member relative to the other in the direction of the tool axis and a spring holding said clutch normally engaged and a dead spindle engaged by the pressure of the tool against the work in the operation of said tool, the dead spindle having a resilient member by which it is normally released, the tension of said resilient member being overcome and a driving connection being established when the tool is pressed against the work, a housing or casing enclosing the said spindle and overload release and dead spindle means, the dead spindle having a non-positive braking surface and the casing having a cooperating non-positive braking surface, in the path of said dead spindle braking surface in the releasing operation of the dead spindle, said surfaces being engaged when the dead spindle is released in the absence of pressure of the tool against the work, the dead spindle being rotatable by hand in either direction, when said braking surfaces are engaged, thus providing for adjustment of the screw driver to the work said surfaces being disengaged on pressure of the tool against the work.

6. In a portable power driven screw driver or wrench having an overload releasing clutch, a spindle driven thereby and a dead spindle clutch, the latter having a compression spring by which it is held normally open, whereby it is adapted to be closed by pressure of the tool or bit against the work, the dead spindle clutch comprising a moving clutch member which is normally disengaged by said spring, said first named spindle and the moving clutch member having axial telescoping relatively rotatable means which serve as an axial bearing therebetween, said spring being within and bearing upon an external element of said telescoping means and reversely bearing upon an internal element thereof and the tool having a housing enclosing both said spindle and clutches, the overload releasing clutch having a spring whereby it is normally closed and a moving clutch member advanced by said last named spring to hold the clutch in engagement, said latter spring having at its opposite end, an abutment for taking up the reaction of said spring against said latter clutch member and a rotary thrust bearing on the housing supporting said latter abutment whereby the momentum of the moving clutch member is applied directly to the housing which takes up the vibration of the clutch.

7. In a portable power driven screw driver or wrench ha ing a spindle and an overload releasing clutch comprising a power driven clutch member which rotates about the spindle axis and a co-operating clutch member which slides on the spindle, an antifriction member whereby the last named clutch member is keyed to the spindle, a spring holding the clutch normally engaged, an adjusting nut mounted on said spindle, a spindle housing enclosing the spindle and clutch, an adjustable abutment supported on said nut which is operable from outside the housing which has an opening for this purpose and an abutment secured to the spindle and resting on the housing and adapted to receive clutch vibrations whereby the vibration of the clutch is absorbed by the housing, a dead spindle clutch having a clutch member rigid with the said spindle which is provided with an abutment preventing longitudinal motion of the said spindle in said housing, a co-operating dead spindle clutch member in the form of a sleeve encircling said spindle and mounted to slide and rotate thereon, a tubular cap secured to the end of the spindle housing and supporting said latter dead spindle clutch member and a spring tending to release said dead spindle clutch member.

8. In a portable motor driven rotary tool, adapted to be supported and controlled by hand, the same having a spindle housing, an overload releasing clutch comprising a clutch member with a continuous driving connection to the motor, a spindle in said housing on which spindle said clutch member is rotatively mounted, a sliding clutch member mounted on the spindle in driving relation thereto and co-operating with said rotative clutch member, a helical compression spring engaging said sliding clutch member, an abutment for the spring opposite said clutch member and a sleeve threaded on said housing which is slotted inside said sleeve, a support for said spring abutment inside said housing and extending through said slots into engagement with said sleeve whereby the abutment is supported, a driven spindle having a bearing in the lower end of said housing and a normally released dead spindle clutch comprising two clutch members one above the other and a compression spring urging the lower clutch member downwardly, said dead spindle clutch connecting said driven spindle to said first mentioned spindle, said dead spindle clutch being engageable by pressure of the tool against the work when the driven spindle is moved upwardly in opposition to the tension of said last named spring, said first named and driven spindles having axial telescoping relatively rotatable means which serve as an axial bearing therebetween, said last named spring being within and bearing upon an external element of said telescoping means and reversely bearing upon an internal element thereof.

9. In a portable motor driven rotary tool, adapted to be supported and controlled by hand, the same having a spindle housing, an overload releasing clutch comprising a clutch member with a continuous driving connection to the motor, a spindle in said housing on the axis of which spindle said clutch member is rotatively mounted a sliding clutch member on the spindle in driving relation thereto and co-operating with said rotative clutch member, a spring engaging said sliding clutch member, an abutment for the spring opposite said clutch member, a sleeve in threaded engagement with said spindle housing and having a support for said spring abutment, a driven spindle having a bearing in the lower end of said housing and a normally released dead spindle clutch comprising two clutch members one above the other and a compression spring urging the lower clutch member downwardly, said dead spindle clutch connecting said driven spindle to said first mentioned spindle, said dead spindle clutch being engageable by pressure of the tool against the work when the driven spindle is moved upwardly in opposition to the tension of said last named spring, said first named and driven spindles having axial telescoping relatively rotatable means which serve as an axial bearing therebetween, said last named spring being within and bearing upon an external element of said telescoping means and reversely bearing upon an internal element thereof.

10. In a portable motor driven rotary tool, adapted to be supported and controlled by hand, the same having a motor housing and a spindle housing, an overload releasing clutch member, an annulus driven from the motor and having a boss with a bearing in said spindle housing, an overload releasing clutch member secured in said boss, a spindle extending through said annulus and having a bearing in the spindle housing, a sliding clutch member mounted on the spindle and co-operating with said first mentioned clutch member, a helical spring encircling the spindle and engaging said sliding clutch member holding it normally in engagement and an abutment for the spring opposite said clutch member, a sleeve in threaded engagement with said spindle housing, a support for said abutment carried by said sleeve, and a driven spindle having a bearing in the lower end of said spindle housing and a normally released clutch comprising two clutch members one above the other and a compression spring urging the lower clutch member downwardly, said normally released clutch connecting said driven spindle to said first mentioned spindle, said latter clutch being engageable by pressure of the tool against the work when the driven spindle is moved upwardly in opposition to the tension of said last named spring, said first named and driven spindles having axial telescoping relatively rotatable means which serve as an axial bearing therebetween, said last named spring being within and bearing upon an external element of said telescoping means and reversely bearing upon an internal element thereof.

11. In a portable motor driven tool of the type which is adapted to screw driving and nut running, a spindle housing, a main spindle, an overload releasing clutch comprising a clutch member, mounted to rotate, and having connections for power driving, said overload releasing clutch comprising a clutch member slidably mounted in driving relation to said spindle, said clutch members having inter-engaging releasing teeth, a spring for maintaining the sliding clutch member normally in engagement and an abutment for said spring opposite to said latter member, an adjusting sleeve having a threaded engagement with said housing and having means for supporting said abutment, a driven spindle in the form of a sleeve mounted on said first mentioned spindle, said first mentioned spindle forming an axial bearing for said driven spindle, an external bearing for said driven spindle in which it is mounted to slide, said bearing being in the lower end of said housing and being adapted to support the driven spindle, a dead spindle clutch, said driven spindle having a dead spindle clutch member at its upper end, said dead spindle clutch including a clutch member in the form of a sleeve encircling the main spindle and rotating therewith, a spring within said main spindle bearing thereupon and upon the driven spindle holding said dead spindle clutch normally disengaged, the same being engaged by pressure of the tool against the work.

12. In a portable electric tool a driving clutch member rotatively mounted and having releasing clutch teeth, a spindle, a releasing toothed clutch member co-operating with said first mentioned clutch member and slidably mounted on the spindle and having a driving connection therewith, a housing having means for rotatively supporting the spindle and preventing longitudinal motion thereof in said housing, a helical compression spring surrounding the spindle and bearing against the sliding clutch member and tending to hold it in engagement with the driving clutch member, an abutment supporting the spring oppositely to the sliding clutch member, said abutment being rotatively supported on the casing and having means whereby it is adjusted along the spindle and a dead spindle clutch connected to the end of said spindle opposite to the driving clutch member, and normally released, and a rotary driven member connected to the spindle by said dead spindle clutch, said spindle and rotary driven member having axial telescoping relatively rotatable means which serve as an axial bearing therebetween, a compression spring within and bearing upon an external element of said telescoping means and reversely bearing upon an internal element thereof to effect said normal release, the dead spindle clutch connecting said driven member to the spindle when the tool is pressed against the work.

13. In a power driven screw driver of the hand supported and directed type, having a motor and a motor casing, a main spindle driven from said motor, and a spindle housing, an intermediate spindle therein, overload releasing clutch means, connected to said main spindle and a cooperating clutch member mounted to slide in the direction of the spindle axis and having a driving connection to said intermediate spindle which is positively supported by said spindle housing, a helical compression spring bearing against said moving clutch member, tending to maintain the clutch in engagement, an abutment supported by said intermediate spindle and adjustable in the direction of the spindle axis, said abutment supporting the end of said spring opposite to said cooperating clutch member, whereby the vibration of the sliding clutch in releasing and engaging is taken up in and by said spindle housing and not transmitted to the hand of the operator, means for preventing longitudinal motion of said spindles and a normally released dead spindle clutch and a driven spindle mounted to slide in the direction of said axis and connected to said intermediate spindle by said dead spindle clutch, a spring urging said driven spindle downwardly, tending to release the latter clutch which is adapted to be engaged by the pressure of the tool against the work, and non-positive braking means connected to and moving with the driven spindle and cooperating braking means on the housing in the path of said braking means on the spindle, said cooperating braking means being adapted to be automatically engaged by the releasing action of the dead spindle clutch and to be automatically released as said latter clutch is engaged, the driven spindle being held stationary when the dead spindle clutch is released, said dead spindle being however, rotatable by hand in either direction to adjust the tool to the work when the braking means are engaged.

GLENN C. WILHIDE.